(12) United States Patent
Schunter

(10) Patent No.: US 12,255,800 B2
(45) Date of Patent: *Mar. 18, 2025

(54) TECHNOLOGIES FOR PROTOCOL EXECUTION WITH AGGREGATION AND CACHING

(71) Applicant: Intel Corporation, Santa Clara, CA (US)

(72) Inventor: Matthias Schunter, Seeheim-Jugenheim (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,587

(22) Filed: Jul. 21, 2023

(65) Prior Publication Data

US 2023/0421475 A1 Dec. 28, 2023

Related U.S. Application Data

(63) Continuation of application No. 17/445,163, filed on Aug. 16, 2021, now Pat. No. 11,750,492, which is a
(Continued)

(51) Int. Cl.
*H04L 29/08* (2006.01)
*H04L 12/24* (2006.01)
(Continued)

(52) U.S. Cl.
CPC .......... *H04L 43/18* (2013.01); *H04L 41/0686* (2013.01); *H04L 67/566* (2022.05); *H04L 67/568* (2022.05)

(58) Field of Classification Search
CPC ..... H04L 43/18; H04L 67/566; H04L 67/568; H04L 41/0686; H04L 12/26; H04L 29/08; H04L 12/24
(Continued)

(56) References Cited

U.S. PATENT DOCUMENTS 5,924,116 A 7/1999 Aggarwal et al.
6,161,208 A 12/2000 Dutton et al.
(Continued)

OTHER PUBLICATIONS

Mark Manulis and Jorg Schwenk, 2009, "Security model and framework for information aggregation in sensor networks", ACM Trans. Sen. Netw. 5.2, Article 13, (Apr. 2009), 28 pages,. DOI=10.1145/1498915.149819 http://doi.acm.org/10.1145/1498915.1498919.
(Continued)

*Primary Examiner* — Jude Jean Gilles
(74) *Attorney, Agent, or Firm* — JAFFERY WATSON HAMILTON & DESANCTIS LLP

(57) ABSTRACT

Technologies for protocol execution include a command device to broadcast a protocol message to a plurality of computing devices and receive an aggregated status message from an aggregation system. The aggregated status message identifies a success or failure of execution of instructions corresponding with the protocol message by the plurality of computing devices such that each computing device of the plurality of computing devices that failed is uniquely identified and the success of remaining computing devices is aggregated into a single success identifier.

20 Claims, 9 Drawing Sheets

Related U.S. Application Data continuation of application No. 16/863,169, filed on Apr. 30, 2020, now Pat. No. 11,121,958, which is a continuation of application No. 15/860,301, filed on Jan. 2, 2018, now Pat. No. 10,644,984, which is a continuation of application No. 14/580,758, filed on Dec. 23, 2014, now Pat. No. 9,860,153.

(51) Int. Cl.
  *H04L 41/0686* (2022.01)
  *H04L 43/18* (2022.01)
  *H04L 67/566* (2022.01)
  *H04L 67/568* (2022.01)

(58) Field of Classification Search
  USPC .......................................................... 709/224
  See application file for complete search history.

(56) References Cited

U.S. PATENT DOCUMENTS

| | | | |
|---|---|---|---|
| 6,216,199 B1 | 4/2001 | DeKoning et al. | |
| 6,256,747 B1 | 7/2001 | Inohara et al. | |
| 6,629,199 B1 | 9/2003 | Vishlitzky et al. | |
| 7,386,608 B2 | 6/2008 | Tsai et al. | |
| 7,603,458 B1 | 10/2009 | Sexton et al. | |
| 7,769,885 B1 * | 8/2010 | Kompella | H04L 45/026 370/219 |
| 8,332,502 B1 | 12/2012 | Neuhaus et al. | |
| 8,539,109 B1 | 9/2013 | Lee et al. | |
| 9,258,335 B1 | 2/2016 | Taylor | |
| 9,860,153 B2 | 1/2018 | Schunter | |
| 10,644,984 B2 * | 5/2020 | Schunter | H04L 41/0686 |
| 11,121,958 B2 * | 9/2021 | Schunter | H04L 67/568 |
| 11,750,492 B2 * | 9/2023 | Schunter | H04L 67/566 |
| 2003/0140112 A1 | 7/2003 | Ramachandran et al. | |
| 2005/0129183 A1 | 6/2005 | Booth | |
| 2006/0173985 A1 | 8/2006 | Moore | |
| 2006/0265489 A1 | 11/2006 | Moore | |
| 2007/0079062 A1 * | 4/2007 | Miyawaki | G06F 3/067 711/112 |
| 2007/0133556 A1 | 6/2007 | Ding et al. | |
| 2007/0143549 A1 | 6/2007 | Saha et al. | |
| 2007/0174419 A1 | 7/2007 | O'Connell et al. | |
| 2009/0013210 A1 | 1/2009 | McIntosh et al. | |
| 2009/0027061 A1 * | 1/2009 | Curt | H02J 13/00026 324/539 |
| 2010/0049815 A1 | 2/2010 | Vanecek et al. | |
| 2011/0029461 A1 * | 2/2011 | Hardin, Jr. | G06Q 30/06 705/412 |
| 2011/0182189 A1 * | 7/2011 | Martini | H04L 45/245 370/248 |
| 2013/0104251 A1 | 4/2013 | Moore et al. | |
| 2013/0297708 A1 | 11/2013 | Beerse et al. | |
| 2013/0339473 A1 | 12/2013 | McCaffrey et al. | |
| 2014/0052922 A1 | 2/2014 | Moyer et al. | |
| 2014/0053003 A1 | 2/2014 | Moyer et al. | |
| 2014/0089591 A1 | 3/2014 | Moir et al. | |
| 2014/0181247 A1 | 6/2014 | Hindawi et al. | |
| 2014/0219021 A1 | 8/2014 | Trantham et al. | |
| 2014/0351713 A1 | 11/2014 | Hallerström Sjöstedt et al. | |
| 2015/0006622 A1 | 1/2015 | Lim et al. | |
| 2015/0019788 A1 * | 1/2015 | Adler | G06F 13/4221 710/313 |
| 2015/0156194 A1 | 6/2015 | Modi et al. | |
| 2016/0036771 A1 | 2/2016 | Yadav et al. | |
| 2016/0072667 A1 | 3/2016 | Zhu et al. | |
| 2016/0157221 A1 | 6/2016 | Kim | |
| 2016/0182343 A1 * | 6/2016 | Schunter | H04L 67/568 709/224 |
| 2018/0145898 A1 * | 5/2018 | Schunter | H04L 67/568 |
| 2021/0044549 A1 | 2/2021 | Renjith | |

OTHER PUBLICATIONS

Hani Alzaid, Ernest Foo and Juan Gonzalez Nieto, 2008, "Secure Data Aggregation in Wireless Sensor Network: A Survey", In proceedings of the sixth Australian Conference on Information Security—vol. 81 (AISC '08), Ljiljana Brankovic and Mirka Miller (Eds.), vol. 81, Australian Computer Society, Inc., Darlinghurst, Australia, 93-105.

Boneh, D., Gentry, C., Waters, B., "Collusion Resistant Broadcast Encryption with Short Ciphertexts and Private Keys". Shoup, V. (ed) Crypto'05. LNCS, vol. 3621, pp. 258 (275. Springer, Berlin, Heidelberg, (2005).

Final Office Action in U.S. Appl. No. 18/459,724 mailed Dec. 31, 2024, 7 pages.

* cited by examiner

TECHNOLOGIES FOR PROTOCOL EXECUTION WITH AGGREGATION AND CACHING

CROSS-REFERENCE TO RELATED APPLICATIONS

This Application is a continuation of and claims the benefit of and priority to U.S. application Ser. No. 17/455,163, entitled TECHNOLOGIES FOR PROTOCOL EXECUTION WITH AGGREGATION AND CACHING, by Matthias Schunter, filed Aug. 16, 2021, now allowed, which is a continuation of and claims the benefit of and priority to U.S. application Ser. No. 16/863,169, entitled TECHNOLOGIES FOR PROTOCOL EXECUTION WITH AGGREGATION AND CACHING, by Matthias Schunter, filed Apr. 30, 2020, now issued as U.S. Pat. No. 11,121,958, which is a continuation of and claims the benefit of and priority to U.S. application Ser. No. 15/860,301, entitled TECHNOLOGIES FOR PROTOCOL EXECUTION WITH AGGREGATION AND CACHING, by Matthias Schunter, filed Jan. 2, 2018, now issued as U.S. Pat. No. 10,644,984, which is a continuation of and claims the benefit of and priority to U.S. application Ser. No. 14/580,758, entitled TECHNOLOGIES FOR PROTOCOL EXECUTION WITH AGGREGATION AND CACHING, by Matthias Schunter, filed Dec. 23, 2014, now issued as U.S. Pat. No. 9,860,153, the entire contents of which are incorporated herein by reference.

BACKGROUND

Central command and control devices (e.g., cloud computing devices) are often used to perform large-scale device management functions. For example, a central command device may handle the secure distribution of updates, secure key agreement management, and/or secure life-cycle management for a large number (e.g., billions) of computing devices. Currently, management protocols between a central command device and a large number of computing devices (e.g., endpoints) may be executed primarily based on a couple different approaches. One common approach to executing management protocols is to execute the management protocol with each computing device separately, which requires a large amount of resources and significant expense. Another common approach is to use a tree-based solution in which a hierarchy of management agents proxy the protocol; however, such solutions require the intermediary nodes to be trusted.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
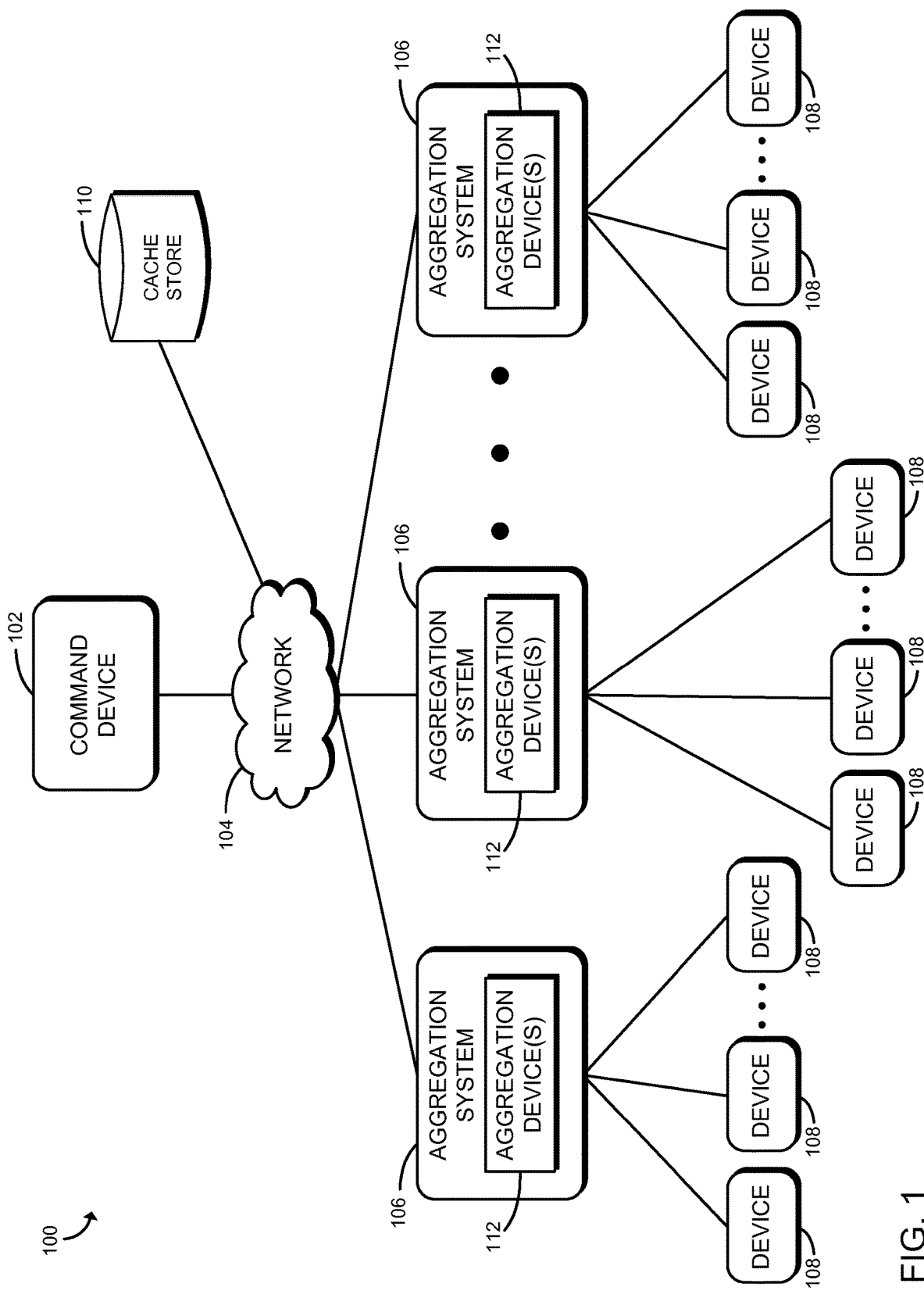
FIG. 1 is a simplified block diagram of at least one embodiment of a system for protocol execution with aggregation and caching.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment." "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A. B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for protocol execution with aggregation and caching includes a command device 102, a network 104, one or more aggregation systems 106, one or more computing devices 108, and a cache store 110. Additionally, as shown in the illustrative embodiment, each of the aggregation systems 106 may include one or more aggregation devices 112.

As described in detail below, in the illustrative embodiment, the command device 102 may handle the secure distribution of updates to computing devices 108, the establishment of secure key agreements (e.g., between the command device 102 and the computing devices 108), and/or perform other management-related functions. For example, the command device 102 may serve as a central command and control center (e.g., in a cloud network) and/or may be configured to execute various management protocols between the command device 102 and the computing devices 108. In doing so, the command device 102 may broadcast messages (e.g., protocol messages) to the computing devices 108, receive status messages and/or other response messages, and retrieve data stored in the cache store 110 by the computing devices 108 (e.g., to complete or further execution of a protocol between the command device 102 and the computing devices 108).

In some embodiments, the command device 102 may broadcast protocol messages to one or more aggregation systems 106 and utilize the aggregation systems 106 to further broadcast the protocol messages to the computing devices 108 (e.g., using a tree-based or other hierarchical approach). For example, in a tree-based approach, the command device 102 may broadcast a message to a high-level (parent) aggregation device 112 of an aggregation system 106, which further broadcasts the message to its children aggregation devices 112. The children aggregation devices 112 further broadcast the message to their children (i.e., the grandchildren devices of the high-level aggregation device 112), and so on. The low-level aggregation devices 112 then transmit the message to the computing devices 108 (the endpoint nodes). Of course, in other embodiments, the system 100 and/or the aggregation systems 106 may utilize a different scheme to broadcast information (e.g., protocol messages) from the command device 102 to the computing device 108.

The computing devices 108 may then execute an operation of the protocol based on the received protocol message and store the response to the cache store 110. As described below, it should be appreciated that the particular operation executed and the response stored may vary significantly depending on the particular protocol being executed between the command device 102 and the corresponding computing device 108. Additionally, the cache store 110 may be embodied as any device, component, and/or structure configured to store data received from a computing device 108 and accessible to the command device 102. For example, in some embodiments, the computing device 108 may publish the response to a storage location associated with a particular Uniform Resource Locator (URL) known to the command device 102. Although the cache store 110 is shown in FIG. 1 as a single independent component, in some embodiments, the cache store 110 may be embodied as multiple components and/or form a portion of one or more of the aggregation systems 106 or computing devices 108. For example, in some embodiments, a computing device 108 may publish its protocol responses to a cache store 110 located on memory or data storage of the computing device 108 itself. In other embodiments, the aggregation devices 112 and/or separate caching servers (not shown) may be utilized to store the protocol responses.

In response to execution of the protocol operation(s) by the computing devices 108, the corresponding aggregation systems 106 may receive status messages from the computing devices 108 that indicate whether the operation was a success or failure. In the illustrative embodiment, each aggregation system 106 aggregates the status messages to generate an aggregated status message for transmission to the command device 102. As described below, the aggregated status message uniquely identifies the computing devices 108 that failed to execute the protocol operation but identify the success of the remaining computing devices 108 with a single identifier (see FIG. 7). In other words, the aggregation system 106 may aggregate responses incoming from the computing devices 108 (e.g., by sorting and removing duplicates). In particular, each aggregation device 112 may aggregate the status responses received from its children or lower-level computing devices 108 and/or the intermediately aggregated status responses received from its children aggregation devices 112. That is, each of the aggregation systems 106 may include one or more aggregation devices 112, which may work cooperatively with one another to broadcast protocol messages to a corresponding set of computing devices 108 and/or aggregate status messages received from the computing devices 108 and/or "lower-level" aggregation devices 112 into an aggregated status message.

Based on the received aggregated status message(s), the command device 102 may determine which computing devices 108 successfully performed the corresponding protocol operation. Additionally, the command device 102 may retrieve the protocol response message published by a particular computing device 108 to the cache store 110 at a point in time at which the command device 102 is ready to continue execution of the protocol. As such, the command device 102 may execute a protocol with many computing devices 108 (e.g., millions of devices) and handle other tasks (e.g., critical tasks for other computing devices 108) until the command device 102 determines it is necessary or prudent to complete/continue execution of the protocol with a particular computing device 108. At that point, the command device 102 may retrieve the protocol response and complete/continue the protocol accordingly. In such a way, it is not necessary for the command device 102 to expend the time and/or resources to complete the execution of the protocol with the computing devices 108 in advance.

The command device 102, each of the computing devices 108, and each of the aggregation devices 112 may be embodied as any type of computing device capable of performing the functions described herein. For example, each of the devices 102, 108, 112 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. Although only one command device 102, one network 104, and one cache store 110 are illustratively shown in FIG. 1, the system 100 may include any number of command devices 102, networks 104, and/or cache stores 110 in other embodiments. For example, in some embodiments, the aggregation systems 106 may include or more networks 104 (e.g., for communication between the aggregation devices 112 of the corresponding aggregation system 106). Further, as described herein, the cache store 110 may be distributed across multiple devices in some embodiments.

Figure 2:
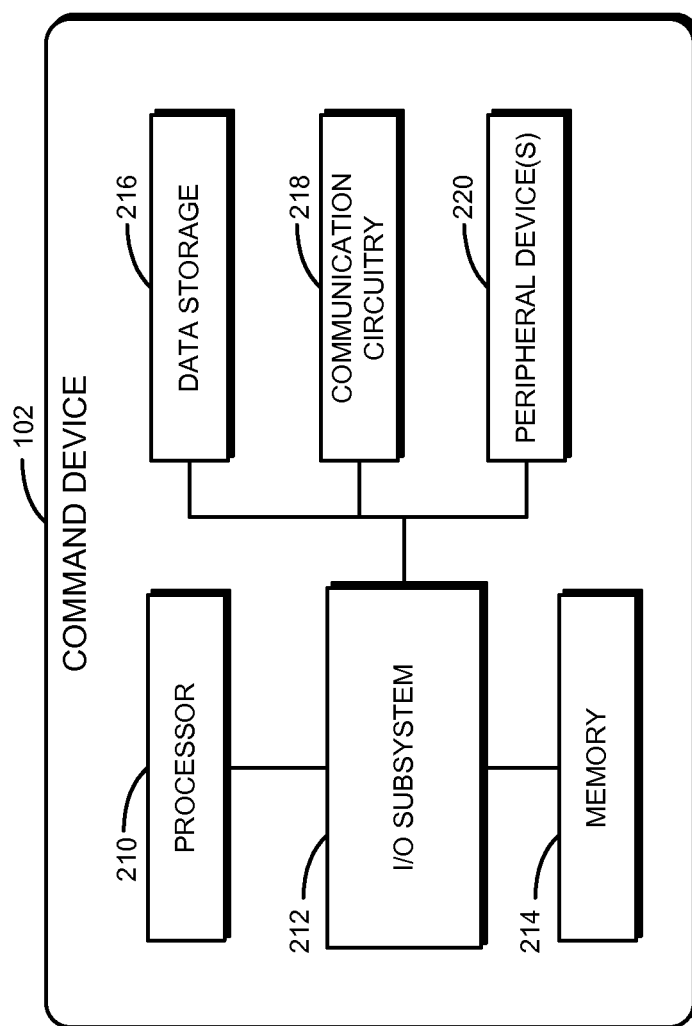
FIG. 2 is a simplified block diagram of at least one embodiment of a command device of the system of FIG. 1.

Referring now to FIG. 2, an illustrative embodiment of the command device 102 is shown. As shown, the illustrative command device includes a processor 210, an input/output ("I/O") subsystem 212, a memory 214, a data storage 216, a communication circuitry 218, and one or more peripheral devices 220. Of course, the command device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the command device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the command device 102. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the command device 102, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the command device 102 useful for performing the functions described herein.

The communication circuitry 218 may be embodied as any communication circuit, device, or collection thereof, capable of enabling communications between the command device 102 and other remote devices (e.g., the aggregation devices 112 of the aggregation systems 106). The communication circuitry 218 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 220 may include any number of additional peripheral or interface devices, such as speakers, microphones, additional storage devices, and so forth. The particular devices included in the peripheral devices 220 may depend on, for example, the type and/or intended use of the command device 102. For example, in some embodiments, the command device 102 may be embodied as a server that has no peripheral devices 220.

Referring back to FIG. 1, the network 104 may be embodied as any type of communication network capable of facilitating communication between the command device 102 and remote devices (e.g., the aggregation devices 112 of the aggregation systems 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

As indicated above, each of the computing devices 108 and each of the aggregation devices 112 may be embodied as any server or computing device capable of performing the functions described herein. For example, the devices 108, 112 may similar to the command device 102. In particular, the computing devices 108 and/or the aggregation devices 112 may include components similar to the components of the command device 102 described above and/or components commonly found in a computing device such as a processor, memory, I/O subsystem, data storage, peripheral devices, and so forth, which are not illustrated in FIG. 1 for clarity of the description.

Figure 3:
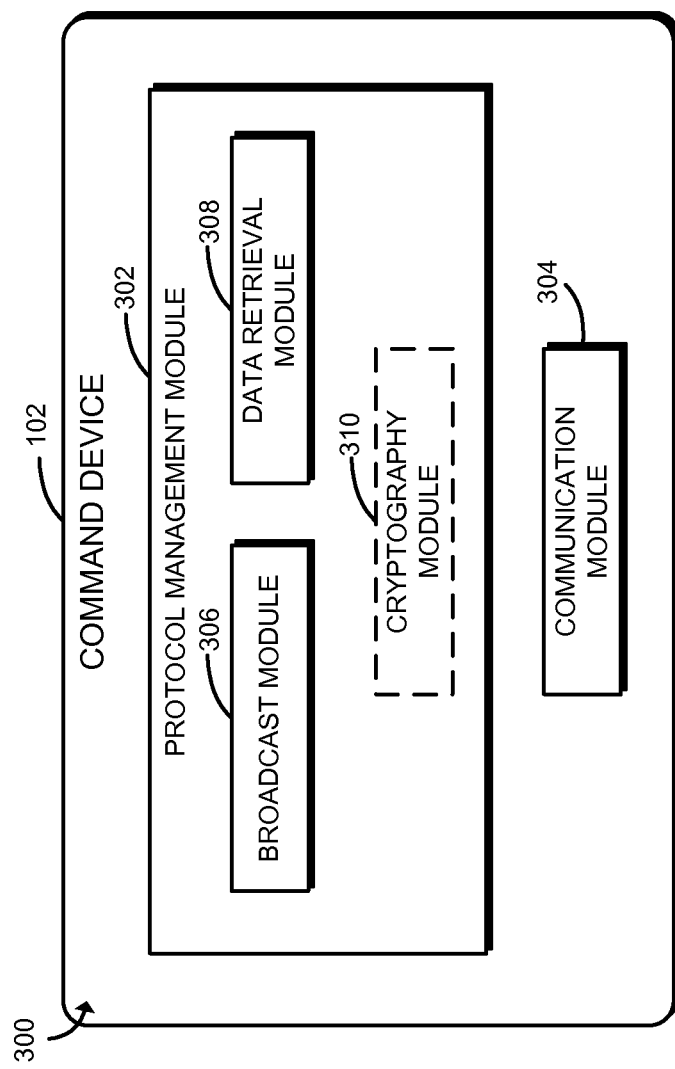
FIG. 3 is a simplified block diagram of at least one embodiment of an environment of the command device of the system of FIG. 1.

Referring now to FIG. 3, in use, the command device 102 establishes an environment 300 for protocol execution. The illustrative environment 300 includes a protocol management module 302 and a communication module 304. Additionally, the protocol management module 302 includes a broadcast module 306 and a data retrieval module 308 and, in some embodiments, may include a cryptography module 310. The various modules of the environment 300 may be embodied as hardware, software, firmware, or a combination thereof. For example, the various modules, logic, and other components of the environment 300 may form a portion of, or otherwise be established by, the processor 210 or other hardware components of the command device 102. As such, in some embodiments, one or more of the modules of the environment 300 may be embodied as a circuit or collection of electrical devices (e.g., a protocol management circuit, a communication circuit, a broadcast circuit, a data retrieval circuit, and/or a cryptography circuit). Additionally, in some embodiments, one or more of the illustrative modules may form a portion of another module and/or one or more of the illustrative modules may be embodied as a standalone or independent module.

The protocol management module 302 is configured to perform various functions associated with the execution of a protocol between the command device 102 and other devices (e.g., the computing devices 108). It should be appreciated that the particular functions performed by the protocol management module 302 may vary depending on the particular protocol. For example, a simple protocol may involve the transmission of a message to a computing device 108 (e.g., via one or more aggregation systems 106) and a response of the computing device 108 to the command device 102 based on execution of an operation associated with the protocol or, more particularly, the transmitted message. As described above, a protocol status message may be transmitted to the command device 102, which may be aggregated with the status messages of other computing devices 108 depending on the particular circumstances (e.g., depending on whether the operation was successful or a failure). Additionally, the computing device 108 may publish the actual response to the simple protocol message to the cache store 110 (e.g., a known URL). If the protocol is a Diffie-Hellmann Key Exchange, for example, the computing device 108 may receive the Diffie-Hellmann public key of the command device 102 (e.g., in a broadcasted message), generate the shared Diffie-Hellmann key based on its private Diffie-Hellman key, and publish its Diffie-Hellmann public key to the cache store 110 for subsequent access by the command device 108 (i.e., for subsequent generation of the shared Diffie-Hellmann key). Of course, the protocol management module 302 may perform various other functions in order to manage the execution of other protocols in other embodiments. In other words, in some embodiments, the protocol management module 302 may perform protocol-specific functions (e.g., for cryptographic key exchanges, broadcast encryption, etc.). Additionally, in some embodiments, the protocol management module 302 may authorize a gateway device to manage or execute a protocol on behalf of the command device 102 as described below.

As discussed above, the illustrative protocol management module 302 includes a broadcast module 306 and a data retrieval module 308 and, in some embodiments, may include a cryptography module 310. The broadcast module 306 handles the broadcasting of protocol messages to various computing devices 108 (e.g., via the communication module 304). As such, in the illustrative embodiment, the broadcast module 306 may determine the interrelationships of the various devices of the system 100. In particular, the broadcast module 306 may determine the hierarchical relationships of the aggregation system(s) 106 (e.g., a tree-based hierarchy) and/or otherwise determine the aggregation devices 112 to which to transmit a particular protocol message in order to ensure that it is received by one or more particular computing devices 108. In some embodiments, the command device 102 may intend to broadcast a particular protocol message to all computing devices 108 in the system 100 in which case the broadcast module 306 may transmit the protocol message to each of the aggregation systems 106 for further dissemination. In other embodiments, the broadcast module 306 may identify a subset of computing devices 108 of the system 100 that should receive a particular protocol message and transmit the message to the appropriate aggregation system(s) 106 or directly to the computing device(s) 108 accordingly.

The data retrieval module 308 handles the retrieval of data from the cache store 110. As discussed above, the computing devices 108 may publish (e.g., to a URL) or otherwise store responses to protocol messages received from the command device 102 (e.g., via the aggregation systems 106). As such, the data retrieval module 308 may determine the storage location within the cache store 110 at which to retrieve a response to a particular protocol message. In some embodiments, the command device 102 and the computing devices 108 utilize a specific naming and/or storage scheme so that the computing devices 108 store response data at locations from which the command device 102 expects to retrieve the data. In other embodiments, the broadcast module 306 of the command device 102 may identify the location at which the computing device 108 is to store/publish the response data in the broadcasted protocol message. It should be appreciated that, in some embodiments, multiple protocol messages between the command device 102 and a particular computing device 108 (e.g., "rounds") may be independent of one another such that the computing device 108 may perform operations associated with a "second" protocol message without having performed operations associated with a "first" protocol message. As such, the protocol may be decomposed into a sequence of protocol executions/rounds that may be broadcasted to the computing device 108 without intervening input from the command device 102. In those embodiments, the computing device 108 may publish/store the responses to the multiple rounds at the same storage location of the cache store 110 or at different (e.g., uniquely identifiable) storage locations of the cache store 110. Further, in some embodiments, the computing device 108 may store a failure log and/or other information associated with protocol execution in the cache store 110 and accessible to the command device 102.

The cryptography module 310 may perform various security-related functions (e.g., attestation and cryptography) for the command device 102. As indicated above, the particular cryptographic functions performed by the cryptography module 310 may vary depending on the particular embodiment (e.g., depending on the particular protocol executed by the command device 102). In various embodiments, the cryptography module 310 may perform encryption/decryption, cryptographic signatures, cryptographic key generation (e.g., asymmetric and/or symmetric key generation), cryptographic hash generation, and/or other cryptographic functions. Further, in some embodiments, the cryptography module 310 may be configured to establish a trusted execution environment. For example, in some embodiments, the cryptography module 310 may be embodied as a security co-processor, such as a trusted platform module (TPM), a secure enclave such as Intel®, Software Guard Extensions (SGX), or an out-of-band processor. Additionally, in some embodiments, the cryptography module 310 may establish an out-of-band communication link with remote devices.

The communication module 304 handles the communication between the command device 102 and remote computing devices (e.g., the aggregation systems 106, the computing devices 108, the cache store 110, etc.) through the network 104. For example, as described herein, the communication module 304 may broadcast protocol messages to the computing devices 108 (e.g., through the aggregation systems 106) and retrieve responses of the computing devices 108 from the cache store 110.

Figure 4:
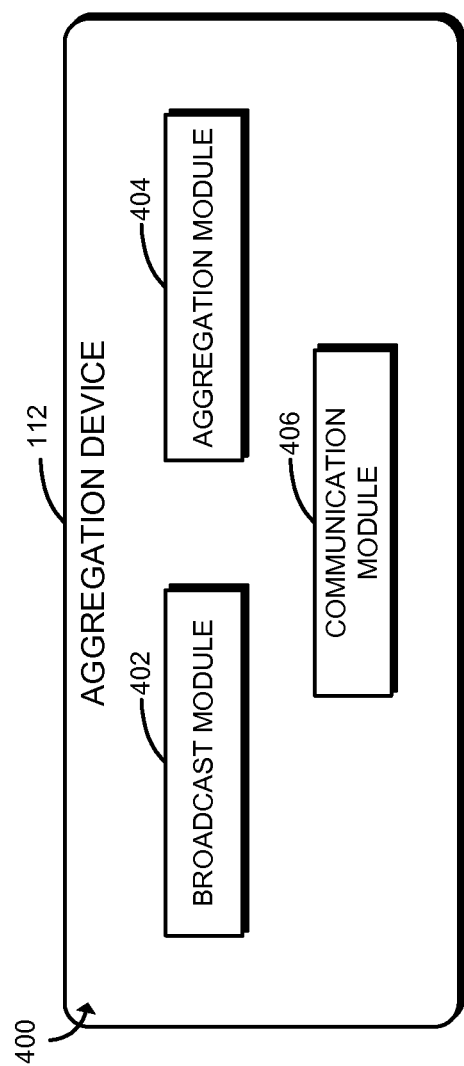
FIG. 4 is a simplified block diagram of at least one embodiment of an environment of an aggregation device of the system of FIG. 1.

Referring now to FIG. 4, in use, each aggregation device 112 establishes an environment 400 for protocol execution. The illustrative environment 400 includes a broadcast module 402, an aggregation module 404, and a communication module 406. The various modules of the environment 400 may be embodied as hardware, software, firmware, or a combination thereof. For example, the various modules, logic, and other components of the environment 400 may form a portion of, or otherwise be established by, the processor or other hardware components of the aggregation device 112. As such, in some embodiments, one or more of the modules of the environment 400 may be embodied as a circuit or collection of electrical devices (e.g., a broadcast circuit, an aggregation circuit, and/or a communication circuit). Additionally, in some embodiments, one or more of the illustrative modules may form a portion of another module (e.g., the broadcast module 402 may form a portion of the communication module 406).

The broadcast module 402 handles the broadcasting of protocol messages received from the command device 102 and/or a higher-level aggregation device 112 to lower-level aggregation devices 112 and/or computing devices 108 (e.g., via the communication module 406). As described above, the aggregation device 112 may form a portion of a particular aggregation system 106 in some hierarchical arrangement relative to the other aggregation devices 112 of the aggregation system 106 (e.g., in a tree-based hierarchy). Accordingly, in the illustrative embodiment, the broadcast module 402 transmits received protocol messages to other aggregation devices 112 further "down" the hierarchy or directly to the computing device(s) 108 depending on the position of the aggregation device 112 in the hierarchy. In some embodiments, the received protocol messages may have particular recipients in which case the broadcast module 402 may determine its hierarchical relationship relative to other devices in order to transmit the protocol messages to the appropriate destination(s). For example, the broadcast module 402 may determine its hierarchical relationship relative to other aggregation devices 112 within the same aggregation system 106, relative to other aggregation systems 106 or the devices 112 therein, relative to the command device 102, and/or relative to the computing devices 108.

The aggregation module 404 is configured to aggregate status messages associated with the success/failure of protocol execution by the computing devices 108. In particular, a computing device 108 may attempt to perform operations (e.g., execute particular instructions) associated with a protocol message received from the command device 102 (e.g., through the aggregation systems 106) and generate a status message that indicates whether the operations were performed successfully. As discussed above, in the illustrative embodiment, the aggregation device 112 occupies a particular hierarchical position in the corresponding aggregation system 106. Depending on the particular embodiment (e.g., the particular hierarchical position), the aggregation module 404 of the aggregation device 112 aggregates the status messages received from the corresponding computing devices 108 and/or lower level aggregation devices 112 (e.g., within the same aggregation system 106) into a single aggregated status message. For clarity, the aggregated status messages generated by aggregation devices 112 other than the highest-level aggregation devices 112 of an aggregation system 106 (or of the system 100 generally) may be described herein as intermediate aggregated status messages. As described herein, in aggregating the lower-level status messages, the aggregation module 404 removes duplicate status messages and/or other data duplication. For example, in some embodiments, the aggregation module 404 generates an aggregated status message based on the received status messages (or intermediate aggregated status messages) in which the aggregated status message uniquely identifies the computing devices 108 that failed and identifies the success of the remaining computing devices 108 with a single success identifier (see FIG. 7).

The communication module 406 handles the communication between the aggregation device 112 and remote computing devices (e.g., the command device 102, other aggregation devices 112, etc.) through one or more networks (e.g., the network 104). For example, as described herein, the communication module 406 may broadcast protocol messages to lower-level aggregation devices 112 and/or the computing devices 108 and transmit aggregated status messages to the command device 102 and/or higher-level aggregation devices 112.

Figure 5:
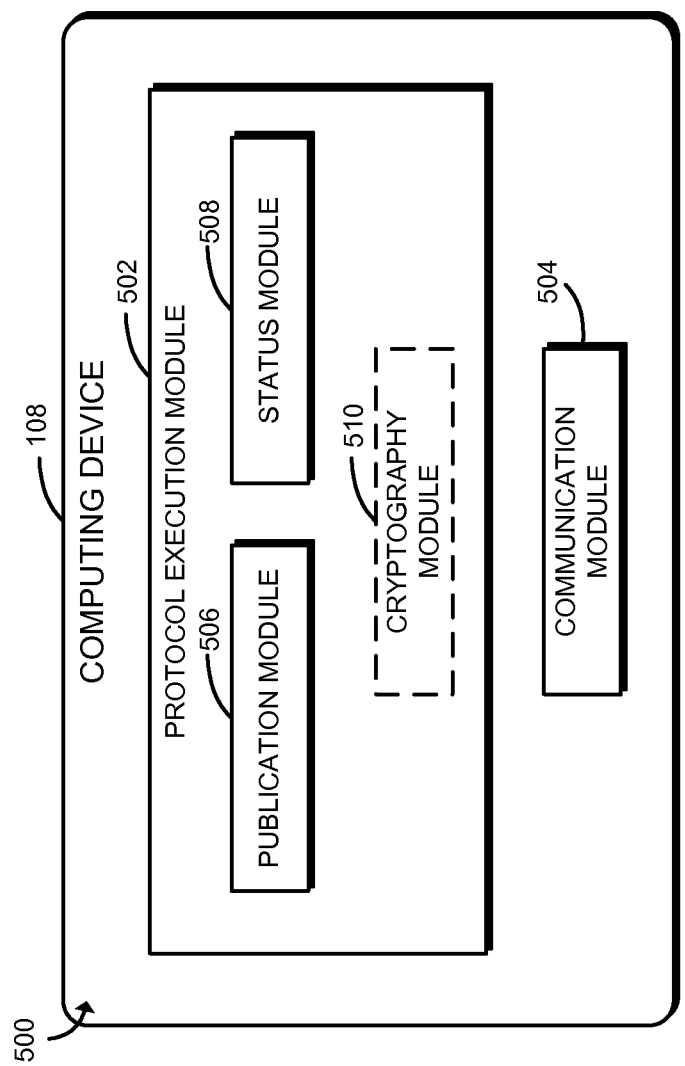
FIG. 5 is a simplified block diagram of at least one embodiment of an environment of a computing device of the system of FIG. 1.

Referring now to FIG. 5, in use, each computing device 108 establishes an environment 500 for protocol execution. The illustrative environment 500 includes a protocol execution module 502 and a communication module 504. Additionally, the protocol execution module 502 includes a publication module 506 and a status module 508 and, in some embodiments, may include a cryptography module 510. The various modules of the environment 500 may be embodied as hardware, software, firmware, or a combination thereof. For example, the various modules, logic, and other components of the environment 500 may form a portion of, or otherwise be established by, the processor or other hardware components of the computing device 108. As such, in some embodiments, one or more of the modules of the environment 500 may be embodied as a circuit or collection of electrical devices (e.g., a protocol execution circuit, a communication circuit, a publication circuit, a status circuit, and/or a cryptography circuit). Additionally, in some embodiments, one or more of the illustrative modules may form a portion of another module and/or one or more of the illustrative modules may be embodied as a standalone or independent module.

The protocol execution module 502 is configured to perform various functions associated with the execution of a protocol between the computing device 108 and other devices (e.g., the command device 102). Similar to the protocol management module 302 described above, the particular functions performed by the protocol execution module 502 of the computing device 108 may vary depending on the particular protocol. For example, as described above, some protocols may involve the generation and/or exchange of cryptographic keys, whereas other protocols may require the performance of other functions by the protocol execution module 502.

As discussed above, the illustrative protocol execution module 502 includes a publication module 506 and a status module 508 and, in some embodiments, may include a cryptography module 510. The publication module 506 publishes and/or otherwise stores responses to protocol messages received from the command device 102 (e.g., via the aggregation systems 106). In particular, in the illustrative embodiment, the publication module 506 stores responses to protocol messages in the cache store 110 for subsequent access by the command device 102. For example, as described above, the publication module 506 may publish the response to a storage location associated with a particular URL known to the command device 102. In some embodiments, the storage location may be predetermined by the computing device 108 and/or the command device 102, for example, according to an understood naming and storage scheme. Further, as described above, the command device 102 may broadcast a storage location at which the computing device 108 is to store a particular protocol response in some embodiments. Additionally, in some embodiments, the publication module 506 may store a protocol execution log that describes the protocol operations performed by the computing device 108 and/or results of protocol operations (e.g., a failure log). In some embodiments, the command device 102 may subsequently access the protocol execution log (e.g., to remedy failed execution of a protocol operation).

The status module 508 transmits status messages regarding the status of execution of one or more operations associated with a protocol message received from the command device 102. For example, in the illustrative embodiment, the status module 508 determines whether a protocol operation corresponding with a protocol message was successful, generates a status response message that indicates the success or failure of the protocol operation, and transmits the status response message to the command device 102. As described above, in the illustrative embodiment, the computing device 108 transmits the status message to the corresponding aggregation system 106 of the computing device 108, which aggregates the status message of the computing device 108 with status messages of other computing devices 108 to generate an aggregated status message for the command device 102.

The cryptography module 510 may perform various security-related functions (e.g., attestation and cryptography) for the computing device 108. In some embodiments, the cryptography module 510 may be similar to the cryptography module 310 of the command device 102 described above. As such, in various embodiments, the cryptography module 510 may perform encryption/decryption, cryptographic signatures, cryptographic key generation (e.g., asymmetric and/or symmetric key generation), cryptographic hash generation, and/or other cryptographic functions. Further, in some embodiments, the cryptography module 510 may be configured to establish a trusted execution environment, and/or may be embodied as a security co-processor, such as a trusted platform module (TPM), a secure enclave such as Intel® Software Guard Extensions (SGX), or an out-of-band processor. Additionally, in some embodiments, the cryptography module 510 may establish an out-of-band communication link with remote devices.

The communication module 504 handles the communication between the computing device 108 and remote computing devices (e.g., the aggregation systems 106, the cache store 110, the command device 102, etc.) through the network 104. For example, as described herein, the communication module 504 may receive broadcasted protocol message from the command device 102 (e.g., through the aggregation systems 106), publish protocol message responses to the cache store 110, and/or transmit status messages to the command device 102 (e.g., in aggregated form via the aggregation systems 106).

Figure 6:
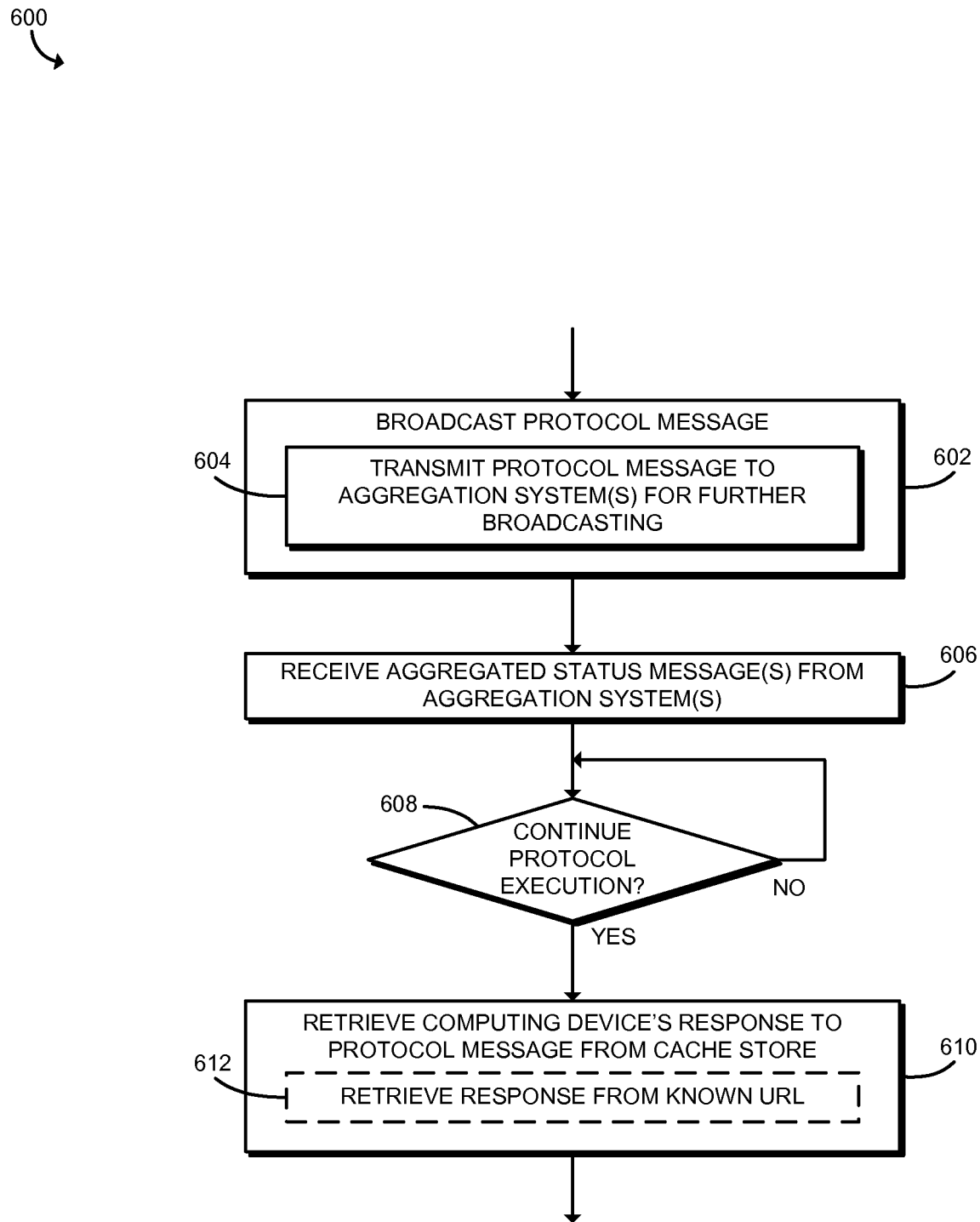
FIG. 6 is a simplified flow diagram of at least one embodiment of a method for protocol execution that may be executed by the command device of the system of FIG. 1.

Referring now to FIG. 6, in use, the command device 102 may execute a method 600 for protocol execution. The illustrative method 600 begins with block 602 in which the command device 102 broadcasts a protocol message to one or more computing devices 108. As described above, in some embodiments, the system 100 may include one or more intervening aggregation systems 106 that may cooperate with one another to broadcast protocol messages from the command device 102 to a plurality of computing devices 108. In doing so, it should be appreciated that the aggregation systems 106 may reduce the network and/or resource load on the command device 102 associated with communicating with each of the computing devices 108 individually. As such, in block 604, the command device 102 transmits the protocol message to the aggregation system(s) 106 (see data flow 902 of method 900 of FIG. 9) for further broadcasting to the computing devices 108 (see data flow 904 of method 900 of FIG. 9). In particular, in the illustrative embodiment, the command device 102 transmits the protocol message to the highest-level aggregation device(s) 112 in each of the corresponding aggregation systems 106. As discussed above, in some embodiments, the protocol message is directed to only a subset of computing devices 108 of the system 100, in which case the command device 102 may broadcast the protocol message to the appropriate aggregation systems 106 and notify those aggregation systems 106 of the destination computing devices 108.

As described herein, in the illustrative embodiment, each of the recipient computing devices 108 may perform a protocol operation associated with the received protocol message, publish a response to the cache store 110, and transmit a status message to the aggregation system(s) 106. Further, in the illustrative embodiment, the aggregation system(s) 106 aggregate the status messages of multiple computing devices 108 into one or more aggregated status messages as described above. Accordingly, the command device 102 receives the aggregated status message(s) from the aggregation system(s) 106 in block 606 (see data flow 912 of method 900 of FIG. 9).

In block 608, the command device 102 determines whether to continue execution of the protocol (i.e., the protocol associated with the broadcasted protocol message) with a particular computing device 108. If so, in block 610, the command device 102 retrieves the computing device 108's response to the protocol message from the cache store 110. As discussed above, the storage location of the particular response in the cache store 110 is known and accessible to the command device 102. For example, in block 612, the command device 102 may retrieve the protocol message response from a known URL to which the computing device 108 published the response. It should be appreciated that, in some embodiments, a significant amount of time may lapse between receipt of the aggregated status message by the command device 102 and retrieval of the protocol message response by the command device 102. As such, in some embodiments, the command device 102 may determine to continue protocol execution with a particular computing device 108 at a convenient time depending on the particular protocol. For example, for a cryptographic key exchange protocol, the command device 102 may retrieve a cryptographic key of the computing device 108 from the cache store 110 when the cryptographic key is needed by the command device 102 (e.g., to securely communicate with the computing device 108).

Figure 7:
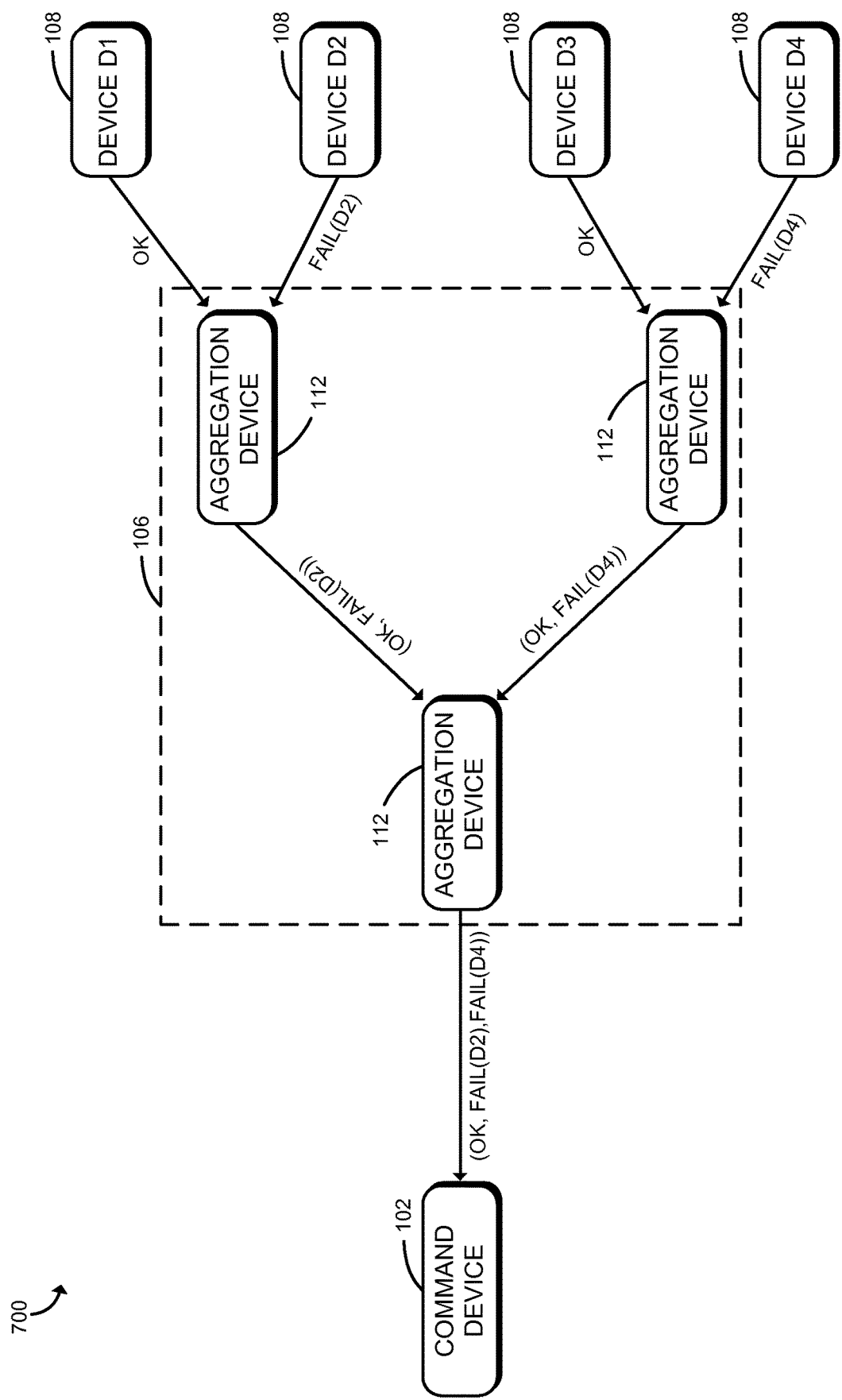
FIG. 7 is a simplified data flow diagram of at least one embodiment of a method for protocol execution that may be executed by an aggregation system of the system of FIG. 1.

Referring now to FIG. 7, in use, the aggregation system 106 may execute a method 700 for protocol execution. It should be appreciated that the method 700 depicts data flows that may be employed in a tree-based hierarchy to aggregate the status messages of the corresponding computing devices 108. As shown in FIG. 7, the method 700 depicts four computing devices 108 (D1, D2, D3, and D4), an aggregation system 106 including three aggregation devices 112, and the command device 102. It should be appreciated that those quantities of devices are depicted in FIG. 7 for simplicity and clarity of the description. However, in other embodiments, the system 100 may include any number of computing devices 108, aggregation systems 106, and aggregation devices 112 as described above in which similar principles may be employed. Further, the aggregation systems 106 and/or the aggregation devices 112 may be arranged in any suitable hierarchical relationship/structure.

Figure 9:
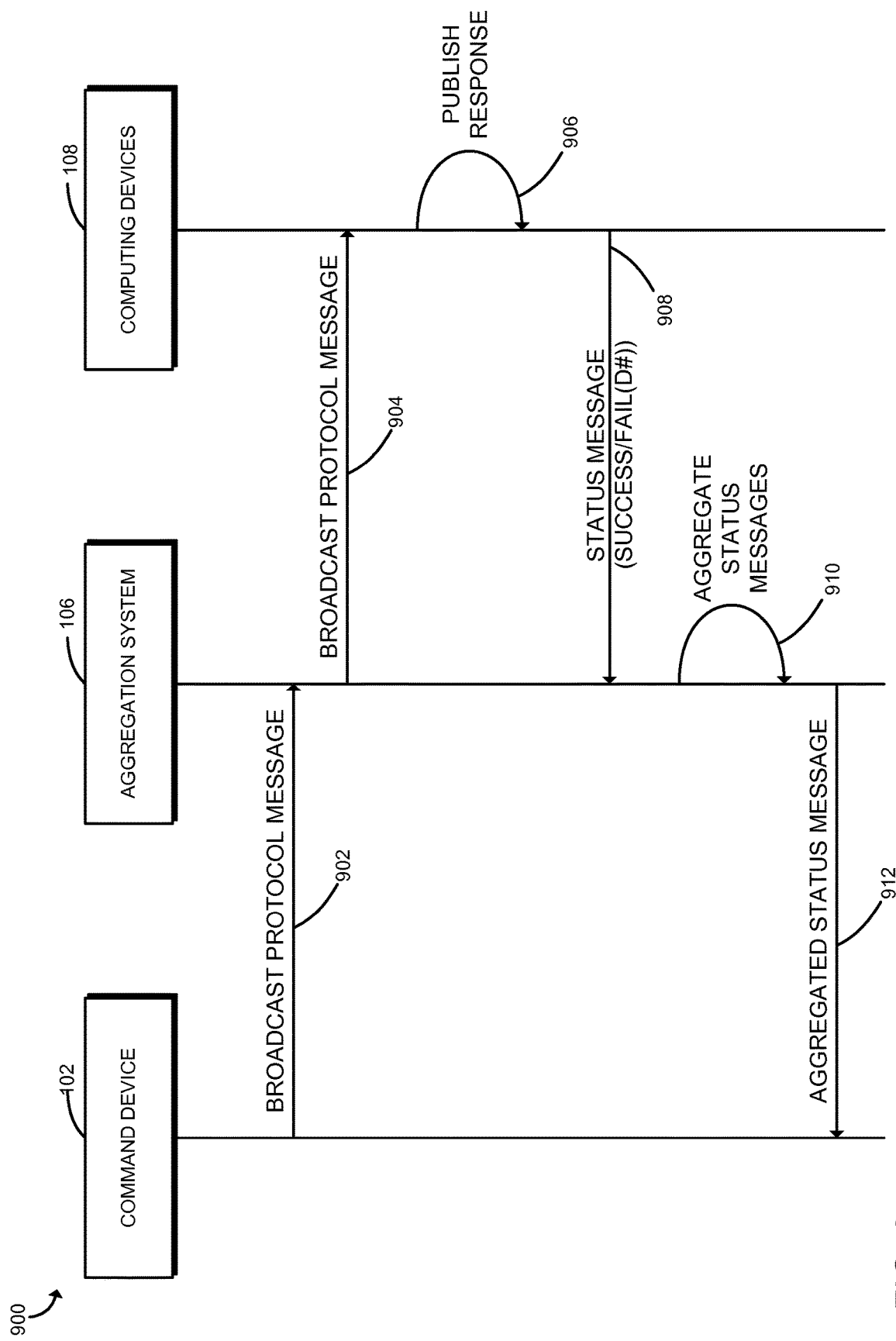
FIG. 9 is a simplified data flow diagram of at least one embodiment of the methods of FIG. 6-8.

As shown in the illustrative embodiment of FIG. 7, the aggregation system 106 receives status messages from each of the four computing devices 108 (see data flow 908 of method 900 of FIG. 9). In particular, a first aggregation device 112 receives status messages from the computing devices 108 D1 and D2 that indicate success (OK) and failure (FAIL(D2)) of the corresponding protocol operations, respectively. Further, a second aggregation device 112 receives status messages from the computing devices 108 D3 and D4 that indicate success (OK) and failure (FAIL(D4)) of the corresponding protocol operations, respectively. As shown, the first aggregation device 112 aggregates the status messages of the computing devices 108 D1 and D2 into a single aggregated status message (OK, FAIL(D2)) and transmits that aggregated status message to the third aggregation device 112. Similarly, the second aggregation device 112 aggregates the status messages of the computing devices 108 D3 and D4 into a single aggregated status message (OK, FAIL(D4)) and transmits that aggregated status message to the third aggregation device 112. In the illustrative embodiment, the third aggregation device 112 aggregates the intermediate aggregated status messages received from the first and second aggregation devices 112 into another aggregated status message (OK, FAIL(D2), FAIL(D4)), which is transmitted to the command device 102. As described above, in the illustrative embodiment, the aggregation devices 112 of the aggregation system 106 aggregate the status messages by removing duplicate status messages that identify protocol execution success and maintaining unique identifiers of computing devices 108 that failed to execute the protocol (see data flow 910 of method 900 of FIG. 9).

It should be appreciated that the aggregated status messages generated by the first and second aggregation devices 112 may be described herein as an intermediate aggregation status message in order to distinguish the aggregated status message from the aggregated status message generated by the third aggregation device 112, which is transmitted to the command device 102. Additionally, in more complex hierarchies, it should be appreciated that a particular aggregation device 112 may receive status messages from any combination of other aggregation devices 112 and/or computing devices 108.

Figure 8:
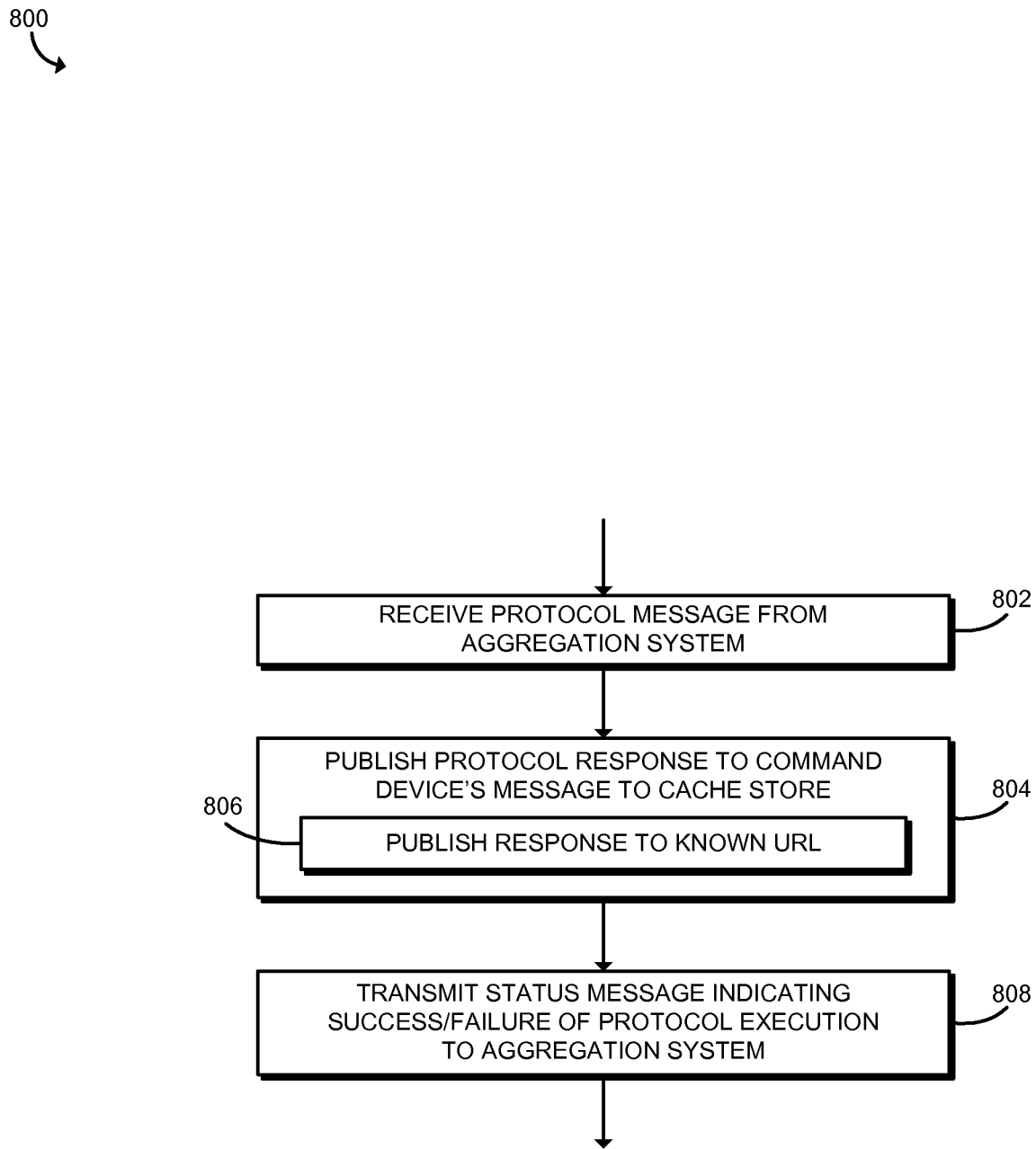
FIG. 8 is a simplified flow diagram of at least one embodiment of a method for protocol execution that may be executed by a computing device of the system of FIG. 1.

Referring now to FIG. 8, in use, one or more of the computing devices 108 may execute a method 800 for protocol execution. The illustrative method 800 begins with block 802 in which the computing device 108 receives a protocol message from the corresponding aggregation system 106. As described above, in the illustrative embodiment, the command device 102 utilizes the aggregation system 106 to broadcast the protocol message to the computing device 108 and the protocol message is associated with the execution of a protocol between the command device 102 and the computing device 108. As such, the computing device 108 may perform (or attempt to perform) the corresponding protocol operation based on the protocol message and publish a response to the protocol message to the cache store 110 in block 804 (see data flow 906 of method 900 of FIG. 9). For example, in block 806, the computing device 108 may publish the response to a URL known the command device 102 as described above. Of course, in some embodiments, the computing device 108 may be unable to execute the particular protocol operation in which case the computing device 108 may, for example, publish a failure log to the cache store 110 instead. In block 808, the computing device 108 transmits a status message that indicates the success/failure of the protocol execution to the corresponding aggregation system 106.

It should be appreciated that the techniques described herein may be employed by the system 100 for aggregation and protocol response caching during protocol execution for any number of protocols executed between the command device 102 and the computing devices 108. For example, as described above, the techniques may be utilized during the execution of a Diffie-Hellmann key exchange between the command device 102 and the computing devices 108. In such an embodiment, the command device 102 may select a prime number, p, and determine a primate root or generator, g (mod p). Further, the command device 102 may select another integer, a, as its private Diffie-Hellmann key and calculate its public Diffie-Hellmann key as $A=g^a$ mod p. The command device 102 broadcasts the public Diffie-Hellmann key, A, as well as the generator, g, and the prime number, p, to one or more of the computing devices 108 (e.g., through the aggregation system(s) 106). One of the computing devices 108 may then select an integer, b, as its own private Diffie-Hellmann key and calculate its public Diffie-Hellmann key as $B=g^b$ mod p. Further, the computing device 108 may calculate the shared Diffie-Hellmann key ($A^b=g^{ab}$) for secure communication and store that key. Additionally, the computing device 108 may publish its public Diffie-Hellmann key, B, to the cache store 110 (e.g., a known URL) and transmit a status message to the aggregation system 106 indicating that the protocol operation was successfully executed ("OK"). As such, the command device 102 may subsequently retrieve the public Diffie-Hellman key of the computing device 108 from the cache store 110, calculate the shared Diffie-Hellmann key ($B^a=g^{ab}$), and securely communicate with the computing device 108 using the shared cryptographic key. Of course, as described above, if the computing device 108 is unable to successfully perform the relevant protocol operations, the computing device 108 may instead publish a failure log to the cache store 110 and indicate that protocol execution was a failure in the protocol status message.

In another embodiment, the command device 102 may utilize the techniques described herein to efficiently establish cryptographic keys for a broadcast encryption scheme. It should be appreciated that in a broadcast encryption scheme, the cryptographic keys may be structured in a hierarchy to allow broadcasting to subsets of entities (e.g., associated with particular cryptographic keys). In some embodiments, the system 100 may be structured as a tree-based hierarchy in which each entity of the system 100 may be considered to be a node such that the command device 102 (Node N) is the highest-level node, the next lower-level nodes are identified as Nodes $N_0$, $N_1$, the next lower-level nodes are identified as Nodes $N_{00}$, $N_{01}$, $N_{10}$, and $N_{11}$, and so on ($N_{00}$ and $N_{01}$ being children of $N_0$ and $N_{10}$ and $N_{11}$ being children of $N_1$). In such embodiments, each node $N_{xy}$ generates a cryptographic key pair $PK(N_{xy})$ and $SK(N_{xy})$. Further, $PK(N_{xy})$ is broadcasted to the children of the node $N_{xy}$ and published to the cache store 110 (e.g., a particular URL) and associated with $N_{xy}$ (e.g., $URL(N_{xy})$). It should be appreciated that the goal of such key distribution is to ensure that each child node has the public keys of its ancestors. In such embodiments, in order to broadcast an encrypted message to all of the nodes, for example, the command device 102 (i.e., node N) or another computing device may retrieve PK(N) from the cache store 110 (e.g., at URL(N)), encrypt the message under PK(N), and broadcast the encrypted message to all of the nodes. It should be appreciated that, in some embodiments, one or more cryptographic keys may be revoked and the keys on the "path" to the revoked nodes may be revoked. Instead, the highest remaining cryptographic keys may be utilized to broadcast messages. For example, when the cryptographic key for $N_{10}$ is revoked, the keys $PK(N_0)$ and $PK(N_{11})$ may be used to encrypt future broadcasted messages.

In some embodiments, it should be appreciated that the command device 102 may delegate authority to execute a protocol between the command device 102 and one or more computing devices 108 to a gateway device. In such embodiments, the gateway device may communicate with a particular computing device 108 to execute one or more rounds of a protocol and store the results of the protocol execution for subsequent access by the command device 102. For example, the gateway device may generate a protocol transcript identifying the functions performed, communications transmitted/received, results, and/or other information associated with the delegated protocol execution. Further, in some embodiments, the gateway device and/or the corresponding computing device 108 may publish the transcript to the cache store 110 at a storage location known and accessible to the command device 102.

EXAMPLES

Illustrative examples of the technologies disclosed herein are provided below. An embodiment of the technologies may include any one or more, and any combination of, the examples described below.

Example 1 includes a command device for protocol execution, the command device comprising a broadcast module to broadcast a protocol message to a plurality of computing devices; and a communication module to receive an aggregated status message from an aggregation system, wherein the aggregated status message identifies a success or failure of execution of instructions corresponding with the protocol message by the plurality of computing devices such that each computing device of the plurality of computing devices that failed is uniquely identified and the success of remaining computing devices is aggregated into a single success identifier.

Example 2 includes the subject matter of Example 1, and further including a data retrieval module to retrieve, from a cache store, a response to the protocol message of a computing device of the plurality of computing devices, wherein the cache store is to store responses of the plurality of computing devices to the protocol message for subsequent access to the responses by the command device.

Example 3 includes the subject matter of any of Examples 1 and 2, and wherein to retrieve the response from the cache store comprises to retrieve the response from a cache store accessed at a uniform resource locator known to both the command device and the corresponding computing device.

Example 4 includes the subject matter of any of Examples 1-3, and wherein to broadcast the protocol message comprises to identify a storage location of the cache store at which each computing device of the plurality of computing devices is to store a response to the protocol message.

Example 5 includes the subject matter of any of Examples 1-4, and wherein to broadcast the protocol message comprises to broadcast a first protocol message of a multi-round protocol; and wherein the broadcast module is further to broadcast a second protocol message of the multi-round protocol to the plurality of computing devices prior to retrieval of the response to the first protocol message.

Example 6 includes the subject matter of any of Examples 1-5, and further including a data retrieval module to retrieve, from a cache store, a failure log of a computing device of the plurality of computing devices in response to an indication by the aggregated status message that the computing device failed to execute the instructions.

Example 7 includes the subject matter of any of Examples 1-6, and wherein to broadcast the protocol message comprising to broadcast the protocol message to at least one aggregation device of an aggregation system to be further broadcasted to the plurality of computing devices.

Example 8 includes a method for protocol execution by a command device, the method comprising broadcasting, by the command device, a protocol message to a plurality of computing devices; and receiving, by the command device, an aggregated status message from an aggregation system, wherein the aggregated status message identifies a success or failure of execution of instructions corresponding with the protocol message by the plurality of computing devices such that each computing device of the plurality of computing devices that failed is uniquely identified and the success of remaining computing devices is aggregated into a single success identifier.

Example 9 includes the subject matter of Example 8, and further including retrieving, by the command device and from a cache store, a response to the protocol message of a computing device of the plurality of computing devices, wherein the cache store is to store responses of the plurality of computing devices to the protocol message for subsequent access to the responses by the command device.

Example 10 includes the subject matter of any of Examples 8 and 9, and wherein retrieving the response from the cache store comprises retrieving the response from a cache store accessed at a uniform resource locator known to both the command device and the corresponding computing device.

Example 11 includes the subject matter of any of Examples 8-10, and wherein broadcasting the protocol message comprises identifying a storage location of the cache store at which each computing device of the plurality of computing devices is to store a response to the protocol message.

Example 12 includes the subject matter of any of Examples 8-11, and wherein broadcasting the protocol message comprises broadcasting a first protocol message of a multi-round protocol; and further comprising broadcasting a second protocol message of the multi-round protocol to the plurality of computing devices prior to retrieving the response to the first protocol message.

Example 13 includes the subject matter of any of Examples 8-12, and further including retrieving, by the command device and from a cache store, a failure log of a computing device of the plurality of computing devices in response to the aggregated status message indicating that the computing device failed to execute the instructions.

Example 14 includes the subject matter of any of Examples 8-13, and wherein broadcasting the protocol message comprising broadcasting the protocol message to at least one aggregation device of an aggregation system to be further broadcasted to the plurality of computing devices.

Example 15 includes a computing device comprising a processor; and a memory having stored therein a plurality of instructions that when executed by the processor cause the computing device to perform the method of any of Examples 8-14.

Example 16 includes one or more machine-readable storage media comprising a plurality of instructions stored thereon that, in response to execution by a computing device, cause the computing device to perform the method of any of Examples 8-14.

Example 17 includes a command device for protocol execution, the command device comprising means for broadcasting a protocol message to a plurality of computing devices; and means for receiving an aggregated status message from an aggregation system, wherein the aggregated status message identifies a success or failure of execution of instructions corresponding with the protocol message by the plurality of computing devices such that each computing device of the plurality of computing devices that failed is uniquely identified and the success of remaining computing devices is aggregated into a single success identifier.

Example 18 includes the subject matter of Example 17, and further including means for retrieving, from a cache store, a response to the protocol message of a computing device of the plurality of computing devices, wherein the cache store is to store responses of the plurality of computing devices to the protocol message for subsequent access to the responses by the command device.

Example 19 includes the subject matter of any of Examples 17 and 18, and wherein the means for retrieving the response from the cache store comprises means for retrieving the response from a cache store accessed at a uniform resource locator known to both the command device and the corresponding computing device.

Example 20 includes the subject matter of any of Examples 17-19, and wherein the means for broadcasting the protocol message comprises means for identifying a storage location of the cache store at which each computing device of the plurality of computing devices is to store a response to the protocol message.

Example 21 includes the subject matter of any of Examples 17-20, and wherein the means for broadcasting the protocol message comprises means for broadcasting a first protocol message of a multi-round protocol; and further comprising means for broadcasting a second protocol message of the multi-round protocol to the plurality of computing devices prior to retrieving the response to the first protocol message.

Example 22 includes the subject matter of any of Examples 17-21, and further including means for retrieving, from a cache store, a failure log of a computing device of the plurality of computing devices in response to the aggregated status message indicating that the computing device failed to execute the instructions.

Example 23 includes the subject matter of any of Examples 17-22, and wherein the means for broadcasting the protocol message comprising means for broadcasting the protocol message to at least one aggregation device of an aggregation system to be further broadcasted to the plurality of computing devices.

Example 24 includes a computing device for protocol execution, the computing device comprising a communication module to receive a protocol message from an aggregation system, wherein the protocol message corresponds with execution of a protocol between the computing device and a command device; and a protocol execution module to (i) publish a response to the protocol message to a cache store for subsequent access by the command device and (ii) transmit a status message to the aggregation system, wherein the status message indicates a success or failure of execution of instructions corresponding with the protocol message.

Example 25 includes the subject matter of Example 24, and wherein to publish the response comprises to publish the response to a cache store accessed at a uniform resource locator known to both the command device and the computing device.

Example 26 includes the subject matter of any of Examples 24 and 25, and wherein to publish the response comprises to publish a failure log to the cache store in response to a failure to execute the instructions corresponding with the protocol message.

Example 27 includes the subject matter of any of Examples 24-26, and wherein the protocol execution module is further to perform a protocol operation associated with the received protocol message, wherein the published response is associated with the performed protocol operation.

Example 28 includes a method for protocol execution by a computing device, the method comprising receiving, by the computing device, a protocol message from an aggregation system, wherein the protocol message corresponds with execution of a protocol between the computing device and a command device; publishing, by the computing device, a response to the protocol message to a cache store for subsequent access by the command device; and transmitting, by the computing device, a status message to the aggregation system, wherein the status message indicates a success or failure of execution of instructions corresponding with the protocol message.

Example 29 includes the subject matter of Examples 28, and wherein publishing the response comprises publishing the response to a cache store accessed at a uniform resource locator known to both the command device and the computing device.

Example 30 includes the subject matter of any of Examples 27 and 28, and where publishing the response comprises publishing a failure log to the cache store in response to a failure to execute the instructions corresponding with the protocol message.

Example 31 includes the subject matter of any of Examples 27-29, and further including performing, by the computing device, a protocol operation associated with the received protocol message, wherein the published response is associated with the performed protocol operation.

Example 32 includes a computing device comprising a processor; and a memory having stored therein a plurality of instructions that when executed by the processor cause the computing device to perform the method of any of Examples 28-31.

Example 33 includes one or more machine-readable storage media comprising a plurality of instructions stored thereon that, in response to execution by a computing device, cause the computing device to perform the method of any of Examples 28-31.

Example 34 includes a computing device for protocol execution, the computing device comprising means for receiving a protocol message from an aggregation system, wherein the protocol message corresponds with execution of a protocol between the computing device and a command device; means for publishing a response to the protocol message to a cache store for subsequent access by the command device; and means for transmitting a status message to the aggregation system, wherein the status message indicates a success or failure of execution of instructions corresponding with the protocol message.

Example 35 includes the subject matter of Example 34, and wherein the means for publishing the response comprises means for publishing the response to a cache store accessed at a uniform resource locator known to both the command device and the computing device.

Example 36 includes the subject matter of any of Examples 34 and 35, and where the means for publishing the response comprises means for publishing a failure log to the cache store in response to a failure to execute the instructions corresponding with the protocol message.

Example 37 includes the subject matter of any of Examples 34-36, and further including means for performing a protocol operation associated with the received protocol message, wherein the published response is associated with the performed protocol operation.

Example 38 includes an aggregation system for protocol execution, the aggregation system comprising a plurality of aggregation devices, each of the aggregation devices comprising a broadcast module to broadcast protocol messages received from a command device to a plurality of computing devices; and an aggregation module to aggregate status messages received from at least one of other aggregation devices or computing devices of the plurality of computing devices; wherein the aggregation system is to receive a status message from each computing device of the plurality of computing devices, wherein the status message indicates a success or failure of a protocol operation by the corresponding computing device that is associated with a protocol message of a protocol between the command device and the corresponding computing device; generate an aggregated status message based on the status messages received from the plurality of computing devices, wherein the aggregated status message uniquely identifies computing devices that failed to perform the protocol operation and identifies the success of remaining computing devices with a single success identifier; and transmit the aggregation status message to the command device.

Example 39 includes the subject matter of Example 38, and wherein the aggregation system is further to receive, from the command device, the protocol message corresponding with execution of the protocol; and transmit the protocol message to the plurality of computing devices.

Example 40 includes a method for protocol execution by an aggregation system, the method comprising receiving, by the aggregation system, a status message from each computing device of a plurality of computing devices, wherein the status message indicates a success or failure of a protocol operation by the corresponding computing device that is associated with a protocol message of a protocol between a command device and the corresponding computing device; generating, by the aggregation system, an aggregated status message based on the status messages received from the plurality of computing devices, wherein the aggregated status message uniquely identifies computing devices that failed to perform the protocol operation and identifies the success of remaining computing devices with a single success identifier; and transmitting, by the aggregation system, the aggregation status message to the command device.

Example 41 includes the subject matter of Example 40, and further including receiving, by the aggregation system and from the command device, the protocol message corresponding with execution of the protocol; and transmitting, by the aggregation system, the protocol message to the plurality of computing devices.

Example 42 includes one or more machine-readable storage media comprising a plurality of instructions stored thereon that, in response to execution by a computing system, cause the computing system to perform the method of any of Examples 40-41.

Example 43 includes an aggregation system for protocol execution, the aggregation system comprising means for receiving a status message from each computing device of a plurality of computing devices, wherein the status message indicates a success or failure of a protocol operation by the corresponding computing device that is associated with a protocol message of a protocol between a command device and the corresponding computing device; means for generating an aggregated status message based on the status messages received from the plurality of computing devices, wherein the aggregated status message uniquely identifies computing devices that failed to perform the protocol operation and identifies the success of remaining computing devices with a single success identifier; and means for transmitting the aggregation status message to the command device.

Example 44 includes the subject matter of Example 43, and further including means for receiving, from the command device, the protocol message corresponding with execution of the protocol; and means for transmitting the protocol message to the plurality of computing devices.

The invention claimed is:

1. At least one computer-readable medium having stored thereon instructions which, when executed, cause an aggregation device to facilitate operations comprising:
   determining a plurality of status messages, wherein a status message comprises an indication of a status of a compute entity of a plurality of compute entities;
   storing, for the status message, an indication of a status of the corresponding compute entity of the plurality of compute entities;
   aggregating the plurality of status messages into a single aggregated status message that indicates an aggregate status of the plurality of compute entities; and
   transmitting the single aggregated status message to a remote computing device.

2. The computer-readable medium of claim 1, wherein the plurality of compute entities are arranged in a hierarchical structure.

3. The computer-readable medium of claim 1, wherein a status message indicates a health of the corresponding compute entity.

4. The computer-readable medium of claim 1, wherein the operations further comprise:
   obtaining a request, from the remote computing device, for the indication of the status relating to one or more operations of one of the plurality of compute entities.

5. The computer-readable medium of claim 3, wherein the status message indicates a performance parameter of the corresponding compute entity of the plurality of compute entities.

6. The computer-readable medium of claim 1, wherein storing the indication of the status of the corresponding compute entity of the plurality of compute entities comprises to storing the indication of the status of the one or more operations of the corresponding compute entity of the plurality of compute entities.

7. The computer-readable medium of claim 1, wherein the operations further comprise determining a storage location identifier from the remote computing device that identifies a location of a memory, wherein storing the indication of the status comprises storing the indication of the status of the one or more operations of the corresponding compute entity of the plurality of compute entities at a memory accessed at the location of the memory identified by the storage location identifier.

8. An aggregation device comprising:
   communication circuitry to obtain a plurality of status messages, wherein a status message comprises an indication of a status of a compute entity of a plurality of compute entities, and
   protocol execution circuitry coupled to the communication circuitry, the protocol execution circuitry to:
   store, for the status message, an indication of a status of the corresponding compute entity of the plurality of compute entities;
   aggregate the plurality of status messages to a single aggregated status message which indicates an aggregate status of the plurality of compute entities; and
   transmit the single aggregated status message to a remote computing device.

9. The aggregation device of claim 8, wherein the plurality of compute entities are arranged in a hierarchical structure, wherein the status message indicates a health of the corresponding compute entity.

10. The aggregation device of claim 8, wherein the protocol execution circuitry is further to:
    obtain a request, from the remote computing device, for the indication of the status relating to one or more operations of one of the plurality of compute entities.

11. The aggregation device of claim 8, wherein the status message indicates a performance parameter of the corresponding compute entity of the plurality of compute entities, wherein to store the indication of the status of the corresponding compute entity of the plurality of compute entities comprises to store the indication of the status of the one or more operations of the corresponding compute entity of the plurality of compute entities.

12. The aggregation device of claim 8, wherein the communication circuitry is further to receive a storage location identifier from the remote computing device that identifies a location of a memory, wherein to store the indication of the status of the corresponding compute entity of the plurality of compute entities comprises to store the indication of the status of the one or more operations of the corresponding compute entity of the plurality of compute entities.

13. An apparatus comprising:
   circuitry coupled to a memory, the circuitry to obtain a plurality of status messages, wherein a status message comprises an indication of a status of a compute entity of a plurality of compute entities; and
   a memory to store, for the status message, an indication of a status of the corresponding compute entity of the plurality of compute entities, aggregate the plurality of status messages to a single aggregated status message which indicates an aggregate status of the plurality of compute entities, and transmit the single aggregated status message to a remote computing device.

14. The apparatus of claim 13, wherein the plurality of compute entities are arranged in a hierarchical structure, wherein the status message indicates a health of the corresponding compute entity, wherein the protocol execution circuitry is further to obtain a request, from the remote computing device, for the indication of the status relating to one or more operations of one of the plurality of compute entities.

15. The apparatus of claim 13, wherein the status message indicates a performance parameter of the corresponding compute entity of the plurality of compute entities, wherein to store the indication of the status of the corresponding compute entity of the plurality of compute entities comprises to store the indication of the status of the one or more operations of the corresponding compute entity of the plurality of compute entities.

16. The apparatus of claim 13, wherein the circuitry is further to receive a storage location identifier from the remote computing device that identifies a location of a memory, wherein to store the indication of the status of the corresponding compute entity of the plurality of compute entities comprises to store the indication of the status of the one or more operations of the corresponding compute entity of the plurality of compute entities.

17. A method comprising:
   determining a plurality of status messages, wherein a status message comprises an indication of a status of a compute entity of a plurality of compute entities;
   storing, for the status message, an indication of a status of the corresponding compute entity of the plurality of compute entities;
   aggregating the plurality of status messages into a single aggregated status message that indicates an aggregate status of the plurality of compute entities; and
   transmitting the single aggregated status message to a remote computing device.

18. The method of claim 17, wherein the plurality of compute entities are arranged in a hierarchical structure, wherein a status message indicates a health of the corresponding compute entity.

19. The method of claim 17, wherein the operations further comprise:
   obtaining a request, from the remote computing device, for the indication of the status relating to one or more operations of one of the plurality of compute entities, wherein the status message indicates a performance parameter of the corresponding compute entity of the plurality of compute entities, wherein storing the indication of the status of the corresponding compute entity of the plurality of compute entities comprises to storing the indication of the status of the one or more operations of the corresponding compute entity of the plurality of compute entities.

20. The method of claim 17, further comprising determining a storage location identifier from the remote computing device that identifies a location of a memory, wherein storing the indication of the status comprises storing the indication of the status of the one or more operations of the corresponding compute entity of the plurality of compute entities at a memory accessed at the location of the memory identified by the storage location identifier.

* * * * *